Jan. 6, 1953 — C. F. CARLSON — 2,624,652
GRAPHIC RECORDING
Filed Oct. 11, 1944 — 3 Sheets-Sheet 1
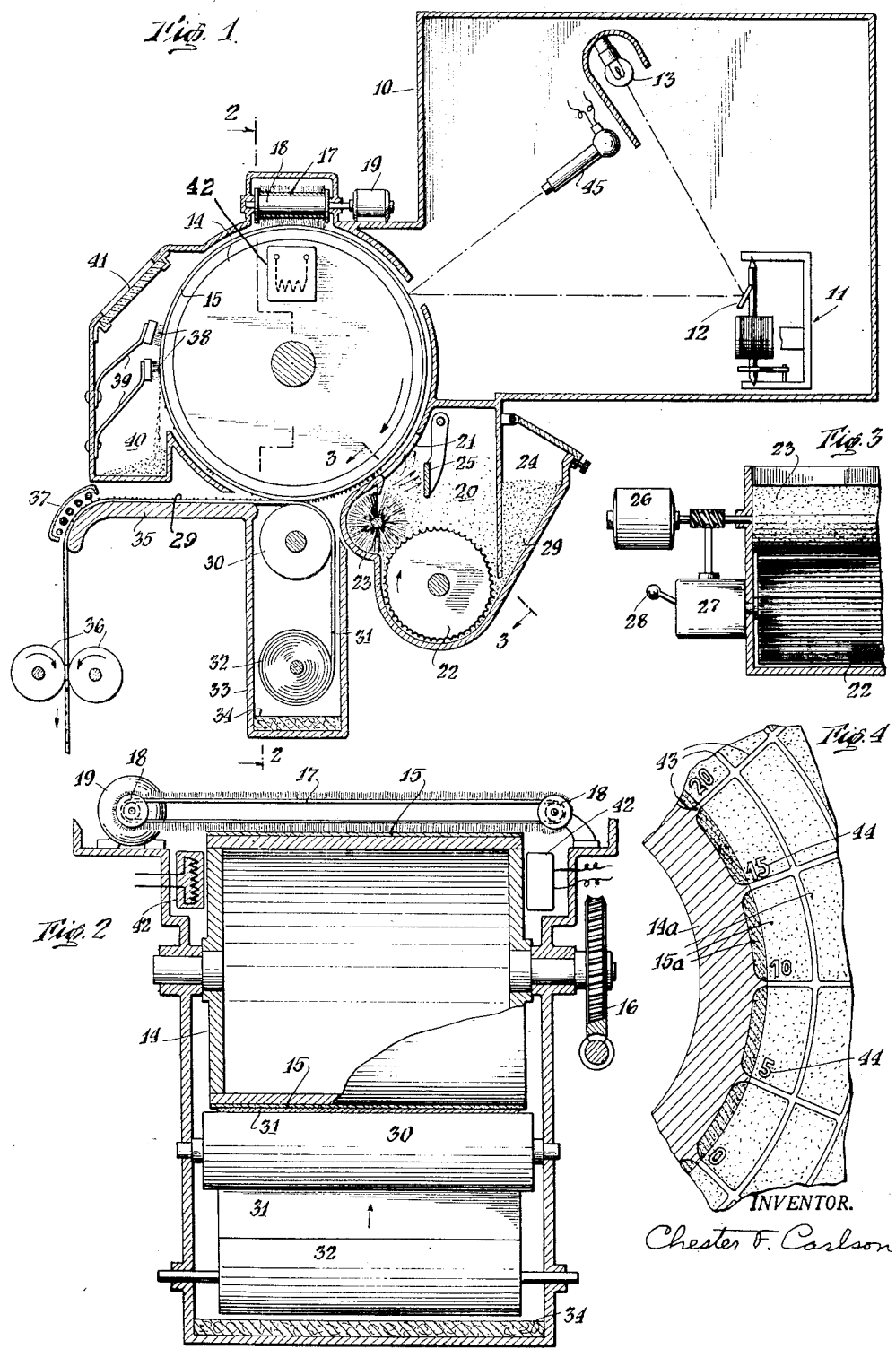
INVENTOR.
Chester F. Carlson Jan. 6, 1953          C. F. CARLSON          2,624,652
GRAPHIC RECORDING
Filed Oct. 11, 1944          3 Sheets-Sheet 2
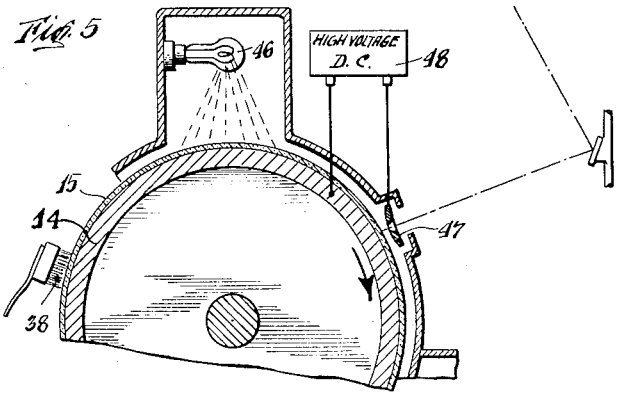
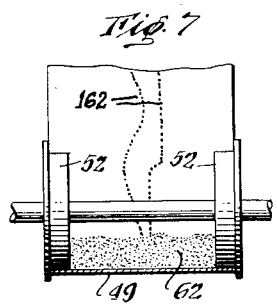
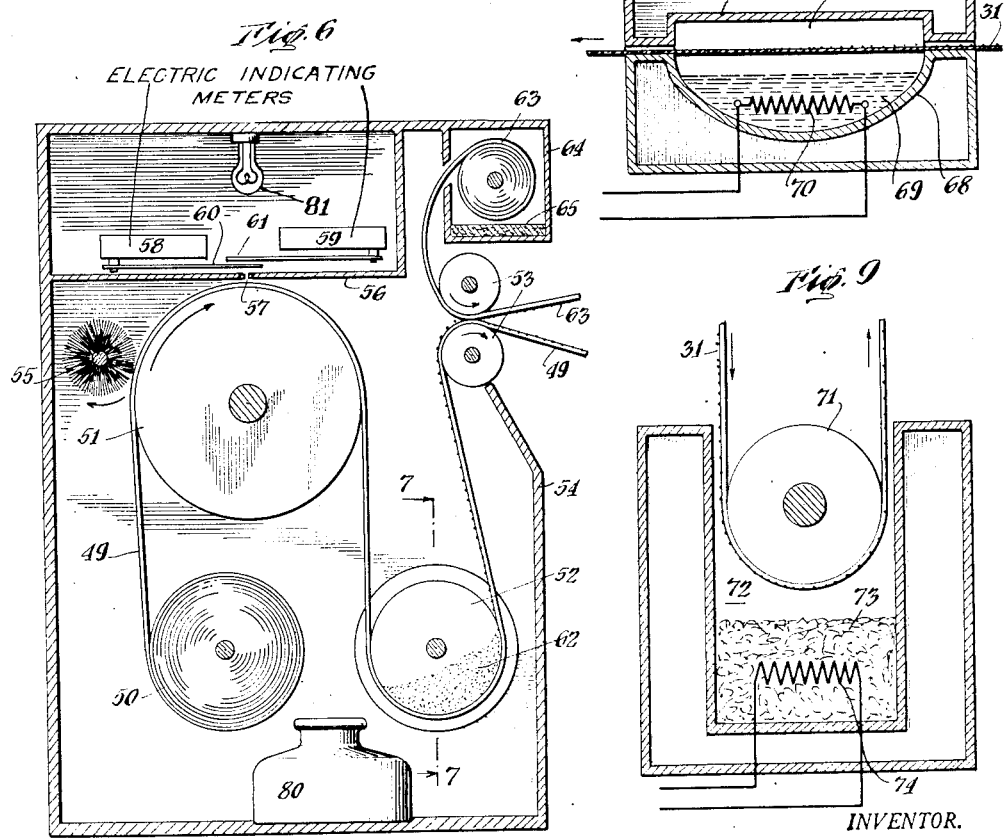
INVENTOR.
Chester F. Carlson Jan. 6, 1953      C. F. CARLSON      2,624,652
GRAPHIC RECORDING Filed Oct. 11, 1944      3 Sheets-Sheet 3

INVENTOR.
Chester F. Carlson

Patented Jan. 6, 1953

2,624,652

UNITED STATES PATENT OFFICE 2,624,652

GRAPHIC RECORDING

Chester F. Carlson, New York, N. Y.

Application October 11, 1944, Serial No. 558,252

5 Claims. (Cl. 346—74)

This invention relates to electrographic recording and particularly to methods of recording data utilizing a process of electrophotography such as that described in Carlson Patent 2,297,691, granted October 6, 1942.

An object of the invention is to improve graphic recording methods and apparatus, and recording meters.

Another object is to improve electrophotography and methods and apparatus associated therewith.

Other objects will be apparent from the following description.

In the drawings:

Figure 1 is an elevation, partly in section, of an electrographic recording meter;

Figure 2 is a section on line 2—2 of Figure 1;

Figure 3 is a detail of the drive for the dusting device for the meter;

Figure 4 is a detail of a modified electrophoto cylinder, carrying a scale;

Figure 5 is a fragmentary sectional view of a modified recording meter;

Figure 6 is a sectional elevation of a further modified meter;

Figure 7 is a section on line 7—7 of Figure 6;

Figures 8 and 9 show fixing chambers for fixing an electrographic image; and

Figure 10:
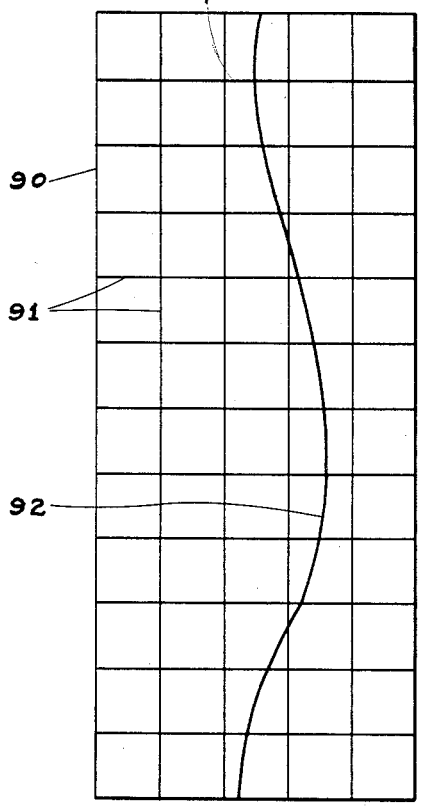
Figure 10 illustrates a recording made according to the method herein described.

Carlson Patent 2,297,691 describes a process of electrophotography wherein a layer of photoconductive insulating material is given an electrostatic charge on its surface and then exposed to a light image while it is supported on a conductive backing to thereby discharge part of the charge leaving an "electrostatic latent image" which is then developed by dusting with a fine powder. The powder may then be transferred by contact to a sheet of paper or other surface and fixed thereon. The present invention contemplates graphic recording meters for recording metric data, embodying this process. It also contemplates improved methods and apparatus for performing parts of the electrophoto process, such as devices for applying the dusting powder to the electrophoto plate, and devices for fixing the powder image onto paper or other surfaces. These devices are useful in electrographic recording generally as well as in graphic recording meters.

Figure 1 shows a recording meter for producing a graphic record on a strip of paper tape of the position of the moving element or pointer of one or more indicating instruments, such as ammeters, voltmeters, galvanometers, hygrometers, pressure gauges and a variety of other signal or condition indicating devices. The meter comprises a casing 10 within which is mounted a galvanometer 11 (for example) having a small mirror 12 mounted on its armature shaft. A small shielded incandescent lamp 13 is mounted to illuminate the mirror. The light beam is reflected by the mirror onto the surface of a rotating cylinder 14 having a coating 15 of photoconductive insulating material thereon.

The axis of the armature is perpendicular to the axis of the cylinder so that as the armature swings on its pivots, the spot of light projected by the mirror onto the cylinder surface will move across the surface in a path parallel to the cylinder axis.

Cylinder 14 is driven at a constant speed by gear train 16 (Figure 2) from a power source. As it rotates in a clockwise direction as viewed in Figure 1 it passes a series of stations at which separate operations take place. At the first of the stations it passes under a charging belt 17 which comprises a plush covered belt running on a pair of flanged pulleys 18, one of which is driven by a small electric motor 19. The plush surface of the belt is in frictional contact with the coating 15 across the cylinder surface, so that a frictional electrostatic resident charge is uniformly applied to the coating as it passes under the belt and a strong electric field is thereby created through the layer.

As the drum surface at the second station passes the light beam reflected from the mirror 12, the spot of light falling on the photoconductive insulating coating 15 will discharge the resident electrostatic charge in a path which the spot describes on the drum surface as it rotates. As the galvanometer armature moves, the position of the light spot will change so that the line it describes on the drum will correspond to the curve of a graph.

A dusting device is mounted at the third station, which is adjacent the drum surface below the exposure position. This comprises a chamber 20 having a window 21 open to the drum surface. A rotating cylinder 22 having a grooved surface is mounted in the bottom of the chamber 20 and a round rotating brush 23 is mounted along its side to throw dust from the cylinder surface into the air of the chamber. A powder supply bin 24 is mounted beside the chamber and has a slit at its bottom communicating with chamber 20 adjacent the drum 22. As the drum rotates it carries powder at a constant rate from chamber 20 and bin 24 to the brush 23 which sprays it into the air of the chamber. An adjustable baffle 25 affords a means for varying the circulation of air in the chamber to carry more or less powder near to the charged surface of coating 15 where it can be captured by the electrostatically charged surface. This produces a powder coating on the charged areas of coating 15, but the path where the coating has been discharged by the light beam remains bare.

Rotating brush 23 is driven by an electric motor 26 as shown in Figure 3 and drum 22 is also driven by the motor through an adjustable speed reducer 27 having a lever 28 for adjusting the speed of roll 22 to control the rate of powder supply to the brush 23.

Powder 29 may be any colored or white electroscopic powder such as a finely divided resin, Vinsol, ethyl cellulose or the like, dyed zein powder or other organic or inorganic composition. The preferred powder has spherical particles less than one mil in diameter. It is desirable that it be either thermoadhesive or soluble in organic solvents for fixing purposes, as will be described later.

A soft pressure roller 30 is mounted at the fourth station directly beneath cylinder 14 to roll a strip of paper tape 31 against the powder-carrying surface. The paper 31 is fed from a roll 32 mounted in a casing 33. It is desirable that the paper be kept slightly damp with water or other liquid to facilitate transfer of the powder to the paper and a moist pad 34 in casing 33 helps to keep the paper in moist condition.

As the paper 31 emerges from between roll 30 and cylinder 14 it is drawn over the surface of metal plate 35 and down between two tension rollers 36. A grid of electrically heated wires 37 is mounted in a housing closely adjacent to the surface of the paper as it passes over plate 35 to fuse the transferred powder onto the paper, thereby producing a permanent graphic record. The cold plate 35 protects the paper from overheating during fusion of the powder.

The color of paper 31 should be in contrast to that of powder 29 to render the graph visible. (With heat fixing it is necessary that the powder be thermoadhesive. A solvent fixing method will be described later.)

Most of the powder is transferred from the coating 15 to paper 31 but a small amount remains. This is removed at the fifth station by brushes or plush covered bars 38 held by springs 39 against the surface of the cylinder, the excess powder falling into trough 40, at the left of the machine as seen in Figure 1. A glass window 41 in the casing 10 permits visual inspection of the condition of the coating 15.

To reduce humidity effects it is desirable that the cylinder 14 be kept at a temperature slightly above the surroundings. For this purpose a pair of metal encased resistance heating elements 42 are mounted in heat transfer relation to the ends of cylinder 14.

For graphic recording it is usually necessary for some sort of scale or indicia to be printed on the chart. In the present device this can be printed on the paper tape in advance but greater accuracy in the record will be obtained if the scale or rulings are applied to the cylinder 14. Figure 4 shows one means for producing the scale. A metal cylinder 14a is used which has its surface cut or etched to provide raised scale ridges 43 and indicia 44. The coating of photoconductive insulating material 15a is filled in between the ridges so that the final surface of the drum is a smooth cylinder, the metal ridges and indicia being exposed. Since the metal will not hold an electrostatic charge the rulings thus provided will not attract the powder and so will be in contrast to the charged areas of coating 15a.

It is also possible to make a scale optically on the coating during recording. Figure 1 shows a light projector 45 for projecting an image of a filament or a slit onto the coating 15 near one edge. The light source may be controlled either directly or by an electromagnetic shutter to project the image onto the plate at intervals determined by a timer or according to any other desired measuring factor, thereby producing a record of that factor along the edge or center of the graph. If desired the projector 45 may project a row of light spots at spaced points across the drum surface. These will describe lines as the drum rotates.

Figure 5 shows a modification of part of the apparatus to produce an electrostatic dust deposit on the graph line instead of on the background. In this case the charging belt at the first station is replaced by a lamp 46 which insures that the photoconductive coating 15 is completely discharged before exposure to the light beam to be recorded. The beam from mirror 12 is projected onto the coating 15 through a narrow slit in a metal bar 47 mounted on insulating supports in close proximity to coating 15. A high voltage D. C. source 48 has its terminals connected to bar 47 and cylinder 14 respectively. The voltage is preferably above 1000 volts but below the breakdown value of the space between the bar and the cylinder. The shape of the bar is such as to concentrate a strong electric field through coating 15 in a path beneath the slit in the bar. As the uncharged surface of coating 15 passes the slit the light beam will illuminate a spot in this path of high electric field and the resulting conductivity in that spot will allow a charge to flow from the metal cylinder 14 to the outer surface of the coating. This charge becomes trapped on the surface as the coating areas progressively pass beyond the slit. This produces a resident charged line or graph of the position of the light spot. The line picks up powder as it passes the dusting chamber while the uncharged background remains clean. Results can be obtained with either the positive or negative D. C. terminal connected to the bar 47, but it is desirable to use the polarity which will cause the greatest powder deposit on the charged graph line. For example, resin powders often carry negative charges, so they adhere best to a positive graph line. In this case bar 47 should be connected to the negative pole of the D. C. source, thereby creating a positive graph line.

When the method and apparatus of Figure 5 is used it is possible to use a graph scale and indicia printed on the surface of coating 15 in insulating ink as described in Carlson Patent 2,357,809 granted September 12, 1944. (Figure 10). The insulating lines become frictionally charged by brush 38 and since they are not photoconductive they are not discharged by lamp 46. They therefore attract powder during dusting to give a visible scale which is transferred to the paper tape along with the graph curve.

Figure 6 illustrates a modified construction of recording meter. The photoconductive element 49 is in strip form. It may comprise a metal foil strip coated with a layer of photoconductive insulating material, a self-supporting band of photoconductive insulating material, or a paper tape impregnated with such material. For example paper impregnated with anthracene, as described in Carlson Patent 2,297,691, is suitable. This is unwound from a roll 50 and passes over a revolving metal drum 51 then around a pair of parallel flanged wheels 52 and finally between a pair of driven rollers 53 to the outside of the casing 54 of the meter. A driven rotary charging brush 55 applies a frictional electric charge to the band as it starts around drum 51. Positioned above drum 51 is a partition 56 having a narrow slit 57 therein extending along the top edge of the drum. A pair of electric indicating meters 58 and 59 are mounted above the partition with their pointer arms 60 and 61 extending across the slit. An electric lamp 81 is mounted above the pointers and illuminates the slit casting a narrow band of light across the width of photoconductive tape 49 except where the pointers 60 and 61 produce shadows. The tape is thereby electrically discharged by the light except where the pointer shadows fall. These shadows therefore describe graph curves on the tape as it moves around the drum. The tape then passes down under the rims of flanged parallel wheels 52 and up again to the driven tension rolls 53. A mass of electroscopic powder 62 rests in the trough formed by tape 49 as it passes under the wheels 52 and is rolled or tumbled by the tape as it moves. (See also Figure 7.) A line of powder 162 will adhere to each of the two charged graph curves described by pointers 60 and 61 rendering the record visible. The tape may be printed with suitable indicia and scales to aid in reading the graph.

A roll of moistened paper 63 is mounted in a casing 64 adjacent rolls 53 and the paper is fed between these rolls in contact with the graph surface of tape 49. This paper carries water or other solvent into contact with the powder lines to partially dissolve them and thereby fix them permanently on the tape. Some of the dye will be transferred to paper 63 affording a duplicate record, in reverse, of the graph. If alcohol soluble powders such as dyed zein, dyed ethyl cellulose or Vinsol resin are used the paper 63 is moistened with alcohol, alcohol-water mixtures or other suitable organic solvents such as butanol. A pad 65 in casing 64 is also moistened with the solvent. An open container 89 of hygroscopic material such as calcium chloride is mounted in the meter casing to dry the air.

Figure 8 shows another solvent-fixing means for powders which are dissolved or at least rendered adhesive by solvents. This can be substituted for the heat-fixing means 37 in the machine of Figure 1 or the solvent-fixing means 63 in the machine of Figure 6. It comprises a chamber 66 insulated by double walls 67 and the bottom 68 of which comprises a reservoir for a solvent 69. A resistance heating element 70 is located in the reservoir for vaporizing the solvent. The chamber is closed except for two horizontal slits at opposite edges to permit paper tape 31 (or 49) to pass through the chamber above the liquid level. Sufficient solvent condenses on the relatively cold tape as it passes through the chamber to partially dissolve a soluble powder image or graph thereon. When the tape leaves the chamber the solvent evaporates leaving the image fixed to the paper.

Figure 9 shows a modified chamber which acts in much the same way. The tape 31 passes around a metal roller 71 mounted in the mouth of a thermally insulated reservoir 72 containing solvent absorbed in a mass of porous or fibrous material 73 in which is embedded a resistance heater 74. The powder image is on the outside face of tape 31 to avoid contact with roll 71. The roll 71 being colder than the inside of the reservoir aids in the condensation of solvent on paper tape 31.

Ordinary alcohol, water, naphtha and other low boiling solvents can be used but to reduce evaporation losses and to obtain greater condensation on the tape it is desirable to use a solvent of medium or high boiling point such as butanol, butyl lactate, octyl alcohol, butyl Cellosolve, Carbitol, diethyl Carbitol, butyl Carbitol, Carbitol acetate and butyl Carbitol acetate. These are all of sufficient volatility to dry from thin films in a short time.

While the photoconductive insulating coating is shown applied directly to the cylinder surface in Figures 1, 2, 4 and 5 it can also be applied to a thin metal cylinder which can be attached to a supporting drum, or a metal foil or plate which can be wrapped around the drum.

Sulfur, anthracene and anthraquinone are suitable photoconductive insulating materials, although a number of other materials can also be used.

Figure 10 shows a completed recording made according to the method described herein. The recording represents a completed graphic record after transfer and fixing of a resin developing powder on paper strip 90. The rulings 91 and graph curve 92 are fused resin powder transferred from the developed image on the photoconductive coating. The rulings were originally formed as printed insulating lines on the coating. The charged coating was passed under a slit across which the shadow of an ammeter needle was cast. Upon development the powder adhered to the graph line and to the insulating rulings, after which transfer to the paper strip 90 was made.

While the present invention has been described as applied to recording meters it is contemplated that the invention, apparatus and methods and parts thereof may be more widely applied in electrophotography, facsimile receiving systems and other fields and it is intended to cover the invention broadly within the spirit and scope of the appended claims.

It is obvious that the shadow arrangement of Figure 6 may replace the mirror beam arrangements of Figures 1 and 5 and vice versa, if desired.

What is claimed is:

1. A graphic recording machine comprising a conductive cylinder, a drive for continuously rotating said cylinder past five stations arranged in order about said cylinder, a coating of photoconductive insulating material on the outside of said cylinder, a discharging device at the first of said stations for discharging any electric charge on said coating as said cylinder rotates past said device, an indicating instrument at the second of said stations having a moving element and a light source co-operating therewith to project a beam of light onto said coating which varies in position across said coating with variations in the position of said moving element, a field producing device also at said second station for creating an electric field through said coating at points where said coating is illuminated by said light beam, a dusting device at the third of said stations for depositing powder on said coating, a transfer device at the fourth of said stations for rolling a band of sheet material against said coating to transfer deposited powder to said band, and a cleaning device at the fifth of said stations for cleaning said coating.

2. A graphic recording machine for continuous recording, said machine comprising, in combination, a conductive support having a substantially smooth surface, drive means for moving said support in a closed path through a cycle of positions, a layer of photoconductive insulating material overlying said substantially smooth support surface in contact therewith, charging means in one of said positions for applying a substantially uniform electrostatic charge to the outer surface of said layer of photoconductive insulating material, light beam projecting means in a subsequent position in said cycle for traversing said layer with a light beam and condition-responsive means for modifying said light beam in accordance with a condition to be recorded, a developing device in a position in said cycle subsequent to the position of said light beam projecting means for continuously applying a finely-divided electrostatically-attractable material to the outer surface of said layer of photoconductive insulating material to deposit said electrostatically-attractable material on the areas of said layer which remain electrically charged, and a transfer device in a position in said cycle subsequent to the position of said developing device for continuously feeding a band of record paper against the outer surface of said layer of photoconductive insulating material to transfer said electrostatically-attractable material to said band of record paper.

3. In combination, means for supporting a band of sheet material having a length greatly exceeding its width, at least the surface of said band comprising photoconductive insulating material, drive means for feeding said band lengthwise through a series of positions, charging means in one of said positions for applying a substantially uniform electrostatic charge to the surface of said band, light beam projecting means in a subsequent position in said series of positions for traversing said band with a light beam and condition-responsive means for modifying said light beam in accordance with a condition to be recorded, a developing device in a position in said series subsequent to the position of said light beam projecting means for continuously applying a finely-divided electrostatically-attractable material to the surface of said band to deposit said electrostatically-attractable material on the areas of said band which remain electrically charged and thereby develop a visible graph on said band.

4. In combination, means for supporting a band of insulating material, means for feeding said band past electrostatic charging means and past a meter indicator to apply an invisible electrostatic graphic recording to said band in accordance with the condition indicated by said meter indicator, means for feeding said band downwardly then upwardly to form a channel therein, and a powder in said channel for developing said electrostatic graphic recording.

5. The method of graphic recording which comprises applying an electrostatic image on a layer of sheet material and developing said electrostatic image which comprises forming a channel of said sheet, with the surface carrying said image concave, and tumbling a powder mass including electroscopic powder particles over said concave surface by moving said layer to vary the inclination to the horizontal of various portions of said surface.

CHESTER F. CARLSON.

REFERENCES CITED

The following references are of record in the file of this patent:

UNITED STATES PATENTS

| Number | Name | Date |
| --- | --- | --- |
| 572,699 | Dunn | Dec. 8, 1896 |
| 625,541 | Cole | May 23, 1899 |
| 1,065,684 | Hesse | June 24, 1913 |
| 1,308,904 | Hopkins | July 8, 1919 |
| 1,451,080 | Mintrop | Apr. 10, 1923 |
| 1,713,226 | Hall | May 14, 1929 |
| 1,805,197 | Wood | May 12, 1931 |
| 1,828,328 | Legg | Oct. 20, 1931 |
| 2,144,999 | Frickett | Apr. 26, 1938 |
| 2,297,691 | Carlson | Oct. 6, 1942 |
| 2,325,086 | Vore | July 27, 1943 |
| 2,328,461 | Keinle et al. | Aug. 31, 1943 |
| 2,357,809 | Carlson | Sept. 12, 1944 |
| 2,396,833 | D'humy | Mar. 19, 1946 |